(12) United States Patent
Shemer et al.

(10) Patent No.: US 10,516,718 B2
(45) Date of Patent: Dec. 24, 2019

(54) PLATFORM FOR MULTIPLE DEVICE PLAYOUT

(71) Applicant: GOOGLE INC., Mountain View, CA (US)

(72) Inventors: Mikhal Shemer, Mountain View, CA (US); Patrik Göran Westin, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 836 days.

(21) Appl. No.: 14/735,489

(22) Filed: Jun. 10, 2015

(65) Prior Publication Data

US 2016/0366206 A1    Dec. 15, 2016

(51) Int. Cl.
*H04L 29/06* (2006.01)
*H04L 29/08* (2006.01)
*G06F 9/54* (2006.01)

(52) U.S. Cl.
CPC ............... *H04L 65/80* (2013.01); *G06F 9/54* (2013.01); *H04L 65/602* (2013.01); *H04L 67/10* (2013.01)

(58) Field of Classification Search
CPC ....... H04L 65/80; H04L 65/602; H04L 67/10; G06F 9/54
(Continued)

(56) References Cited

U.S. PATENT DOCUMENTS 5,533,021 A  *  7/1996  Branstad .............. H04L 29/06
348/464

5,537,408 A  *  7/1996  Branstad .............. H04L 29/06
348/518
(Continued)

FOREIGN PATENT DOCUMENTS

WO      WO 97/10674 A1      3/1997
WO      WO 2014/091643 A1   6/2014

OTHER PUBLICATIONS

Anonymous: "Network Time Protocol", Wikipedia, the free encyclopedia; Jun. 6, 2015 pp. 1-9, XP055292021, retrieved from the internet on Jul. 28, 2016—URL:https:/en.wikipedia.org/w/index.php?title=Network_Time_Protocol&oldid=665705914.
(Continued)

*Primary Examiner* — Arvin Eskandarnia
(74) *Attorney, Agent, or Firm* — Brake Hughes Bellermann LLP

(57) ABSTRACT

Provided is a platform for data devices in which the architecture and runtime parameters of the platform are adaptively updated based on real-time data collected about a network on which the platform operates, the source type (e.g., codec selection) for data being communicated between devices, the grouping/architecture of the devices, or any combination thereof. The platform is thus able to support multiple different types and configurations of data devices under varied, constantly-changing conditions. The platform offers a flexible architecture for a content management and rendering system in which multiple data devices connected via the network each play a unique role in the operation of the system. The data devices are capable of dynamically switching between different roles while the system is in active operation. The platform also includes adaptive delay capabilities as well as adaptive codec selection capabilities.

20 Claims, 4 Drawing Sheets

(58) Field of Classification Search
USPC .................................................... 709/219
See application file for complete search history.

(56) References Cited

U.S. PATENT DOCUMENTS

| | | | |
|---|---|---|---|
| 5,844,600 A * | 12/1998 | Kerr | H04N 7/147 348/14.09 |
| 6,615,243 B1 * | 9/2003 | Megeid | H04L 12/2803 375/E7.019 |
| 6,631,410 B1 * | 10/2003 | Kowalski | H04N 5/0736 348/E5.016 |
| 7,392,421 B1 * | 6/2008 | Bloomstein | G06F 11/1482 714/4.4 |
| 7,571,014 B1 | 8/2009 | Lambourne et al. | |
| 7,742,740 B2 | 6/2010 | Goldberg et al. | |
| 8,020,023 B2 | 9/2011 | Millington et al. | |
| 8,024,055 B1 | 9/2011 | Holmgren et al. | |
| 8,086,752 B2 | 12/2011 | Millington | |
| 8,214,447 B2 | 7/2012 | Deslippe et al. | |
| 8,234,395 B2 | 7/2012 | Millington | |
| 8,239,559 B2 | 8/2012 | Rajapakse | |
| 8,370,678 B2 | 2/2013 | Millington et al. | |
| 8,483,853 B1 | 7/2013 | Lambourne | |
| 8,505,054 B1 * | 8/2013 | Kirley | H04N 21/436 725/74 |
| 8,576,922 B2 * | 11/2013 | Moss | H04N 21/2368 348/423.1 |
| 8,588,949 B2 | 11/2013 | Lambourne et al. | |
| 8,607,281 B2 | 12/2013 | Igoe | |
| 8,965,544 B2 | 2/2015 | Ramsay | |
| 9,521,449 B2 * | 12/2016 | Kidron | H04N 21/4307 |
| 2006/0002681 A1 * | 1/2006 | Spilo | H04N 5/76 386/220 |
| 2006/0072525 A1 * | 4/2006 | Hillyard | H04W 84/20 370/338 |
| 2008/0152165 A1 | 6/2008 | Zacchi | |
| 2012/0195313 A1 * | 8/2012 | White | H04L 43/0858 370/390 |
| 2013/0076651 A1 | 3/2013 | Reimann et al. | |
| 2013/0079909 A1 | 3/2013 | Kashi | |
| 2013/0339537 A1 * | 12/2013 | Joy | H04L 65/1083 709/231 |
| 2014/0177864 A1 * | 6/2014 | Kidron | H04N 21/4307 381/80 |
| 2014/0297815 A1 * | 10/2014 | Rajapakse | H04L 65/4076 709/219 |
| 2015/0327192 A1 * | 11/2015 | Amano | H04N 21/4223 370/350 |
| 2016/0323377 A1 * | 11/2016 | Einkauf | H04L 67/1076 |
| 2018/0034658 A1 * | 2/2018 | Kinage | H04B 1/38 |
| 2018/0316731 A1 * | 11/2018 | Law | H04L 65/103 |

OTHER PUBLICATIONS

International Search Report with Written Opinion for International Application No. PCT/US2016/036383 dated Aug. 11, 2016.

* cited by examiner

PLATFORM FOR MULTIPLE DEVICE PLAYOUT

BACKGROUND

Media data (e.g., audio/video content) is sometimes shared between multiple modules on a network. To get the most out of such media sharing arrangements, it is desirous to have a platform for the data modules that is capable of quickly adapting to changes in network conditions and configurations.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for managing and rendering data. More specifically, aspects of the present disclosure relate to a flexible and real-time adaptive platform for media devices.

One embodiment of the present disclosure relates to a system comprising a plurality of data modules connected to at least one network, wherein each of the data modules is configured to: operate in accordance with a determined operating role, wherein the determined operating role is one of a plurality of operating roles that together define a group of the data modules, and wherein each of the operating roles is characterized by specific functions to be performed by the data module within the group; and switch between different operating roles, different groups of data modules, or both, while the system is in active operation based on one or more parameters associated with the network, with the data module, and/or with other data modules.

In another embodiment, each of the plurality of data modules in the system is configured to: receive data from a data source; send the received data to each of the other data modules within the group of the data modules; and playback the data from the data source in a pre-set time established for the group of the data modules.

In another embodiment, a data module in the group operating in accordance with a first operating role is configured to: establish the pre-set time for playback of the data from the data source; and communicate the pre-set time to the other data modules in the group such that the playback of the data by the group of data modules is in synchronization.

In another embodiment, a data module operating in accordance with a first operating role is configured to: receive data from a data source; determine, for each of the other data modules in the group of data modules, a format in which to send the received data to the data module based on a level of connectivity with the data module and/or a capability of the data module; and send the data to each of the other data modules in the determined format for the respective data module.

In yet another embodiment, the one or more parameters associated with the network, with the data module, and/or with other data modules, which is the basis for a data module to switch between different operating roles, different groups of data modules, or both includes one or more of: a condition of the network, a configuration of the network, a capability of the data module, and a capability of the other data modules.

In still another embodiment, the determination, by a data module operating in accordance with a first operating role, of the format in which to send the received data to each of the other data modules in the group is based on one or more of: network capacity between different data modules, physical proximity between different data modules, hardware capabilities of each of the data modules, and available licensing for the data to be transmitted.

In another embodiment, a data module operating in accordance with a first operating role is configured to: determine a delay associated with each of the other data modules in the group of data modules; and modify a common delay applied to the playout of data between different data modules in the group based on the determined delays associated with each of the other data modules.

In another embodiment, the data module operating in accordance with the first operating role is configured to: receive aggregated delay values from data modules in the group operating in accordance with a second operating role; determine a maximum delay from the aggregated delay values; and modify the common delay applied to the playout of data between different data modules based on the determined maximum delay.

In yet another embodiment, the aggregated delay values received from the data modules operating in accordance with a second operating role include delay values associated with data modules in the group operating in accordance with a third operating role, wherein the third operating role is characterized by playout of the data from the data source.

Another embodiment of the present disclosure relates to a computer-implemented method comprising: determining, by a data module, an operating role for the data module to operate within a group of data modules in communication with one another over a network, wherein the determined operating role is one of a plurality of operating roles that together define the group of data modules, and wherein each of the operating roles is characterized by specific functions to be performed by the data module within the group; operating, by the data module, in accordance with the determined operating role; and while operating, switching to a different operating role, to a different group of data modules, or both, based on one or more parameters associated with the network, with the data module, and/or with other data modules in the group.

In another embodiment, the one or more parameters associated with the network, with the data module, and/or with other data modules in the group that are the basis for switching to a different operating role, to a different group of data modules, or both, includes one or more of: a condition of the network, a configuration of the network, a capability of the data module, and a capability of the other data modules.

In another embodiment, operating in accordance with the determined operating role in the method includes one or more of: receiving data from a data source; sending the received data to one or more of the other data modules within the group of the data modules; and playing back the data from the data source in a pre-set time established for the group of the data modules.

In one or more other embodiments, the methods and systems described herein may optionally include one or more of the following additional features: the determined format for sending the received data to each of the other data modules is as raw data or as coded data; the delay associated with each of the other data modules in the group is one or both of a network delay and a processing delay internal to the data module; the data received from the data source is audio data; each of the plurality of data modules is an independent audio device; at least one of the plurality of data modules is an independent audio device; and/or the audio device is a loudspeaker device.

It should be noted that embodiments of some or all of the processor and memory systems disclosed herein may also be configured to perform some or all of the method embodiments disclosed above. In addition, embodiments of some or all of the methods disclosed above may also be represented as instructions embodied on transitory or non-transitory processor-readable storage media such as optical or magnetic memory or represented as a propagated signal provided to a processor or data processing device via a communication network such as an Internet or telephone connection.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

BRIEF DESCRIPTION OF DRAWINGS

These and other objects, features, and characteristics of the present disclosure will become more apparent to those skilled in the art from a study of the following Detailed Description in conjunction with the appended claims and drawings, all of which form a part of this specification. In the drawings:

Figure 1:
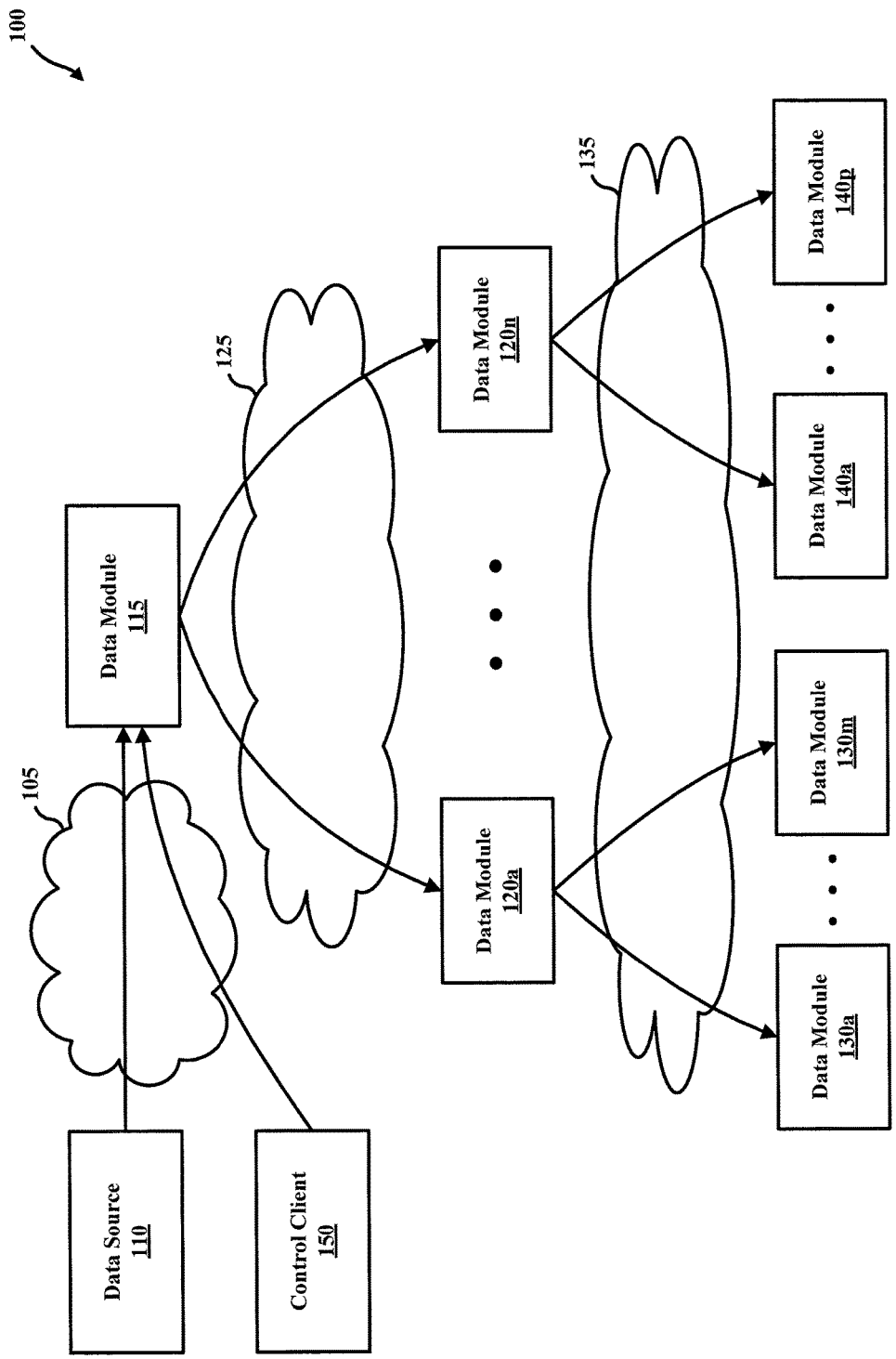
FIG. 1 is a block diagram illustrating an example content management system and surrounding network environment according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments of the methods and systems of the present disclosure will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include other features not described in detail herein. Additionally, some well-known structures or functions may not be shown or described in detail below, so as to avoid unnecessarily obscuring the relevant description.

Embodiments of the present disclosure relate to a platform for media devices in which the architecture and runtime parameters of the platform are adaptively updated based on real-time data. This allows the platform to support multiple different types and configurations of media devices (e.g., audio output devices, such as, for example, loudspeakers) under varied, constantly-changing network conditions and network configurations. For example, the number and/or types of connected devices can be modified on-the-fly, and the platform may adapt to such changes in real-time.

As will be described in greater detail below, the methods and systems of the present disclosure provide a flexible architecture in which each data module (e.g., loudspeaker) plays a unique role (e.g., has particular responsibilities, privileges, and/or capabilities) in the operation of the system. The flexibility of the architecture is partly based on the ability of the data modules to dynamically switch between different roles (e.g., operating roles) while the system is in active operation. In accordance with one or more embodiments described herein, the methods and systems may also include adaptive delay capabilities and, in the context of audio, adaptive codec selection capabilities.

For example, in accordance with at least one embodiment, the platform and system are able to modify/update a common delay applied to the playout of data between different data modules while the system is operating based on various configuration and network characteristics. In addition, the methods and systems described herein are able to learn the network quality over time (e.g., by routinely gathering statistics and improving knowledge of the network under different topologies). Further details about these and other features of the methods and systems of the present disclosure will be provided in the sections that follow.

In accordance with one or more embodiments of the present disclosure, the system is also capable of adaptively selecting the most appropriate and effective codec to be used in the transmission and rendering of data. For example, during active operation, the data modules may transmit any of the following: (i) codec data (e.g., source audio related to, for example, the type/format of audio being sent); (ii) raw PCM (post-decoding and/or post-processing may be optional); (iii) coded with a lossy codec (where interim post-decoding processing may be optional); and (iv) coded with lossless codec (where interim post-decoding processing may be optional). With the above information, a codec may be selected using a cost function that incorporates scores determined/assigned to one or more of the following example parameters: (i) network connectivity/capacity; (ii) system architecture (e.g., within the same area/location (e.g., room), raw PCM is preferable, while between rooms it is optional (e.g., since there is higher tolerance to mismatches in the processing pipeline)); (iii) hardware (HW) capabilities (e.g., CPU usage); and (iv) available licensing. It should be noted that, in accordance with at least one embodiment, it is always preferable to send raw PCM; however, between different rooms (e.g., access points) the network (e.g., available bandwidth) may not always allow it.

For example, in accordance with at least one embodiment of the present disclosure, multiple data modules (e.g., media and/or audio devices) connected to one another via Wi-Fi or Ethernet may be configured for delivering synchronous audio playback within a content management system.

As will be described in greater detail below, the methods and systems of the present disclosure are designed to achieve and maintain highly accurate synchronization (e.g., <20 microseconds (μs)) between different data modules (e.g., audio devices). In accordance with at least one embodiment, all clocks in the system are synchronized by either a hardware and/or software based solution known to those skilled in the art.

In an example application of the methods and systems of the present disclosure, users are given the ability to play audio content available from an audio source (e.g., audio content stored on a user device, audio content associated with a URL and accessible through the user device, etc.) to any combination of audio devices that share a common wireless or wired network. For example, in the context of a multi-room house, a system of speakers may be located in each room (e.g., living room, dining room, bedroom, etc.) of the house, and the speakers forming a system for a given room may be at various locations throughout the room. In accordance with one or more embodiments described herein, audio will be played out synchronously across all of the audio devices selected by the user. It should be understood, however, that the methods and systems described herein may be applicable to any system that requires time synchronization of any data type between different modules on a network, and thus the scope of the present disclosure is not in any way limited by the example application described above.

FIG. 1 is an example content management system 100 in which one or more embodiments described herein may be implemented. Data Source 110 (e.g., a content source such as an audio source (e.g., an online streaming music or video service, a particular URL, etc.)) may be connected to Data Module 115 over a Network 105 (e.g., any kind of network including, for example, Ethernet, wireless LAN, cellular network, etc.). Content (e.g., audio, video, data, mixed media, etc.) obtained from Data Source 110 may be played out by Data Module 115 and/or transported by Data Module 115 to one or more of Data Modules 120a-120n (where "n" is an arbitrary number) over Network 125 (e.g., a wireless LAN or Ethernet). Similarly, content obtained at Data Modules 120a-120n may be played out by Data Modules 120a-120n and/or transported over Network 135 to corresponding Data Modules 130a-130m, Data Modules 140a-140p, or some combination thereof (where "m" and "p" are both arbitrary numbers). It should also be noted that Networks 125 and 135 may be the same or different networks (e.g., different WLANs within a house, one wireless network and the other a wired network, etc.).

A Control Client 150, which will be described in greater detail below, may be in communication with Data Module 115 over Network 105. In accordance with at least one embodiment, Control Client 150 may act as a data source (e.g., Data Source 110) by mirroring local data from the Control Client to Data Module 115.

In accordance with one or more embodiments, the data modules (e.g., Data Module 115, Data Modules 120a-120n, and Data Modules 130a-130m) in the content management system 100 may be divided into groups of data modules. Each group of data modules may be divided into one or more systems, which, in turn, may include one or more individual data modules. In accordance with at least one embodiment, group and system configurations may be set by the user.

Data modules within a group may operate in accordance with different roles. For example, data modules within a group may be divided into Player Modules, Follower Modules, and Renderer Modules (sometimes referred to herein simply as "Players," "Followers," and "Renderers," respectively). Example features and functionalities of the Players, Followers, and Renderers will be described in greater detail below. In accordance with at least one embodiment, the methods and systems of the present disclosure allow for multiple configurations and Player/Follower/Renderer combinations, and further allow such configurations and/or combinations to be modified on-the-fly (e.g., adaptable or adjustable by the user and/or system while the system is in operation). As is further described below, the resulting configuration (Player/Follower/Renderer) is determined based on the grouping, audio source/type, network conditions, etc.

The Player acts as "master" of a group of data modules (e.g., Data Module 115 may be the Player in the example group comprising Data Module 115, Data Modules 120a-120n, and Data Modules 130a-130m in the example content management system 100 shown in FIG. 1). For example, the Player may fetch (e.g., retrieve, obtain, etc.) the data (e.g., audio) from the source (e.g., Data Source 110) and forward the data out to the other data modules (e.g., loudspeakers) in the group. The source of the data obtained by the Player may be, for example, an online audio/video streaming service or website, a portable user device (e.g., cellular telephone, smartphone, personal digital assistant, tablet computer, laptop computer, smart television, etc.), a storage device containing memory for storing audio/video data (e.g., a stand-alone hard drive), and the like. The Player may also be configured to packetize the data obtained from the source and send raw or coded data packets over the network to the data modules in the group. In accordance with at least one embodiment, the Player may be configured to determine whether to send raw or coded data packets to the other data modules in the group based on available bandwidth of the network and/or the capabilities of each particular data module (e.g., each Follower or Renderer's capabilities). For example, it may be the case that one or more devices (e.g., loudspeakers) in the system are not capable of decoding all codecs. Also, in a scenario involving degraded (e.g., limited) network conditions (e.g., low bandwidth), it may be difficult for the Player to send raw data to the other data modules in the group. In such a scenario, the Player may instead send coded data to the other modules. In other instances, the system may be configured to re-encode the data following the initial decoding by the Player. However, it should also be understood that the data originally received by the Player is not necessarily coded in all instances (and thus there may not be an initial decoding performed by the Player).

In addition to the example features and functionalities of the Player described above, in accordance with one or more embodiments of the present disclosure, the Player may also have clock synchronization control and delay management capabilities, as well as the ability to perform various operations associated with transcoding lossy/lossless codecs and/or audio processing. It should be understood that a Player may also be a Follower and/or a Renderer, depending on the particulars of the group configuration.

The Follower is the head of a local system of data modules (e.g., Data Modules 120a-120n may be Followers in different systems of data modules made up of certain Data Modules 130a-130m in the example content management system 100 shown in FIG. 1). The Followers may receive data from a Player and fan (e.g., forward) out the data to the connected Renderers in their respective systems. In accordance with one or more embodiments, the Follower may receive over the network raw or coded data packets from the Player and send the data packets to the Renderers in the system. The Follower may send the packets to the Renderers in the same format as the packets are received from the Player, or the Follower may parse the packets and perform various operations (e.g., transcoding, audio processing, etc.) on the received data before repacketing the data for sending to the connected Renderers. It should be noted that a Follower may also be a Renderer.

In accordance with at least one embodiment of the present disclosure, the Renderer is the endpoint of the data pipeline in the content management system (e.g., Data Modules 130a-130m in the example content management system 100 shown in FIG. 1). For example, the Renderer may be configured to playout the data received from the Follower that heads its respective system. The Renderer may perform additional local processing (e.g., fade in/fade out in the context of audio) on the data received from the Follower prior to playing out the data.

As described above, one or more of the data modules in the content management system may be in communication with and/or receive control commands from a control client connected to the network (e.g., Control Client 150 may be in communication with Data Module 115 over Network 105 in the example content management system 100 shown in FIG. 1). The control client is not a physical data module (e.g., not a physical loudspeaker), but instead may be a device (e.g., cellular telephone, smartphone, personal digital assistant, tablet computer, laptop computer, smart television, etc.) that can control and send messages to the Player. For example, the control client may be used to relay various control messages (e.g., play, pause, stop, volume updates, etc.) to the Player. In accordance with one or more embodiments, the control client may also act as a data source (e.g., Data Source 110) for the content management system, for example, by mirroring local data from the control client to the Player. The control client may use the same communication protocol as the data modules in the content management system.

As will be further described below, the methods and systems of the present disclosure may utilize a reliable UDP-based transport protocol, a transmission control protocol (TCP), or a combination thereof for data transport among the data modules in the content management system. In accordance with one or more embodiments, the data transport protocol used may be divided into two layers. A first layer of the protocol may include, for example, DTLS transport protocol, which handles encryption and certification. A second layer may convey, at least in the context of audio data, the following non-limiting example information: (i) audio configuration and controls; (ii) audio data; (iii) ACK/NACK (e.g., all missing packets may be nack'ed to ensure fidelity); (iv) latency updates; (v) clock synchronization information; and/or (vi) statistics about the network (e.g., end-to-end delay, round-trip time (RTT), packet loss, etc.).

In accordance with one or more embodiments, the content network and platform of the present disclosure may be built in a tree architecture, which is a product of the DTLS protocol that governs the connections between the data modules. The basic components in such a tree architecture are master/client pairs, whereby a client instantiates a connection and the master may or may not accept that connection, based on the provided keys. Each master may have multiple clients (which corresponds, for example, to a Player having multiple Followers/Renderers), and each client is connected to only one master. A connection that times out and does not respond within a predefined interval of time may be considered dead. The client should know which master to follow (e.g., via mDNS signaling), and the client is responsible for informing the master of a new node. Once a master receives a new client connection request, the latter adds that client to the master's list of followers/renderers. The client will then receive all data (e.g., audio) and signaling updates from that master. In accordance with one or more of the embodiments described herein, a Player is always a master, a Renderer is always a client, and a Follower implements both. In addition, a control client is always a client, as it connects to a Player.

It should be understood that the platform, architecture, and system of the present disclosure are extremely dynamic. For example, a user of the system and/or the system itself may modify the unique roles of the data modules, the specific data modules targeted for playout, the grouping of data modules, the designation of an "active" group of data modules, or some combination thereof while the system is in active operation.

Selection of Master

In accordance with one or more embodiments of the present disclosure, the selection of a group leader (e.g., a Player Module) may be performed using a system in which each data module advertises its capabilities to a common system service, which then determines roles for each of the modules, including the election of the group leader, based on the advertised capabilities. For example, the leader selection process may be based on a unique score computed (e.g., by the common system service) for each of the data modules (e.g., loudspeakers). In accordance with at least one embodiment, this score may be computed based on one or more of the following non-limiting parameters: (i) CPU capabilities; (ii) codec availability (e.g., a select or limited number of codecs may be implemented in particular data modules); and (iii) bandwidth/latency.

Message Fan Out

In accordance with one or more embodiments of the present disclosure, the fan out (e.g., distribution, transmission, etc.) of messages (e.g., control messages, data (e.g., audio data), etc.) may originate from the Player and propagate through the network based on the dynamically configured tree structure described above (and illustrated in the example system shown in FIG. 1). All data packets transmitted between different data modules may be processed in order. For example, the system may verify that all packets are received at a particular data module via a negative-acknowledgement/acknowledgement (NACK/ACK) mechanism (e.g., where the master (or transmitting data module) will retransmit all the missing packets to the designated recipient (and not to all of the recipients)).

As described above, the platform and system of the present disclosure provides highly accurate synchronization of data during playout. Such tight synchronization may be achieved, for example, by syncing all of the clocks in the system and setting an exact time at which a portion of the data (e.g., an audio frame) should be played out. As such, the system described herein is capable of handling delays and variations in packet arrival times. For example, in accordance with at least one embodiment, all missing data packets transmitted over the network are NACKed, and therefore it can be assumed that the Renderers are not missing any packets, and should only handle delayed packets.

Delay Management

It should be noted that the delay management capabilities of the platform and system of the present disclosure are not connected to the clock synchronization mechanism and techniques described above. Whereas the clock synchronization mechanism ensures that all data modules are synced to the same clock (e.g., the Player module's clock), the delay management features and processes are designed to set the total delay in the system and, in accordance with at least one embodiment, the delay management is performed by the Player module only.

In an example scenario, the system may have two inherent delays: (1) system delay (or processing delay) and (2) network delay (which is a varying value based on the local network and any difference between available bandwidth and required bandwidth). While such delays may not be entirely eliminated, the methods and systems of the present disclosure are designed to limit the magnitude and effect of these delays.

For example, in accordance with one or more embodiments, it may be assumed that the second type of delay (network delay) is significantly larger than the first type of delay (system delay). Therefore, when the system determines the total playout delay, it may only take into account the second type of delay, or it may take the max value, which is often assumed to be the network delay. For example, the Player may establish (e.g., determine) a target playout time (e.g., in microsecond accuracy), based on the number of samples played out and the desired latency. It should be noted that the desired latency should be sufficiently larger than the network and system delays of all data modules to ensure smooth playback. In the sections that follow, additional details will be provided about how the platform and system of the present disclosure determines initial delay and also adaptively updates/modifies the delay based on real-time data collected from the network.

Initial Delay

In accordance with one or more embodiments, the system may utilize a predetermined value for the initial delay and subsequently iterate on that value based on data acquired (e.g., collected, measured, etc.) from the system/network. The initial delay utilized by the system should be high enough to ensure smooth playback for the majority of users of the system, but not so high that the delay will be noticeable to the users. For example, an initial delay of 250 mS, which is commonly considered inaudible by the users, may be selected and 500 mS set as an upper limit. However, it should be understood that various other values may also be used for the initial delay in addition to or instead of the example values described above.

Adaptive Delay

It should be noted that the initial delay described above is only used by the system until a sufficient amount of statistics have been collected about the local network. In accordance with one or more embodiments of the present disclosure, the methods and systems provided may routinely (e.g., every 1 second during active playout) collect (e.g., measure, calculate, obtain, etc.) various statistics (e.g., Round-Trip-Time (RTT), accumulated network delay, one-way delay (maximum, minimum, variance), frequency/durations of network glitches, etc.) about the system and the local network that the system is operating thereon. While the system is idle (e.g., in idle or sleep mode), the frequency with which statistics are collected may be extended to a time interval longer than that used during active playout. For example, when the system is idle, the system may probe the network every "x" seconds (where "x" may be, for example, 10, 12, 15, etc.). Certain collected statistics may be filtered out, so that an accurate estimate may be obtained for the RTT and also the probability and duration of a network glitch.

The data collected by the system may be analyzed during runtime. Statistics produced as a result of the analyzed data may be stored in a local file on each data module and may be used each time the module powers on (or comes out of standby/sleep mode). The statistics may be collected per module (e.g., per loudspeaker) or per module pair (e.g., loudspeaker pair), and thus the number of possible permutations is a function of the system's architecture.

Modifying (updating, adapting, etc.) the delay usually has an audible impact on playout quality. Therefore, in accordance with at least one embodiment, the frequency/timing of updates to the delay may be limited. For example, in the context of audio, the delay may be modified or updated in response to the start of a new audio segment, at a new playout start following a period of standby, when audio sources are switched, etc.

Since the system of the present disclosure is designed to learn a network's characteristics over time, care may be taken with modifying the delay as changes in delay can be audible to users. For example, in accordance with at least one embodiment, the system avoids modifying the delay within an audio segment (e.g., a track or song) and instead, as network statistics are being collected over time, updates the delay only when a device (e.g., loudspeaker) comes out of being in an idle mode. In a scenario where it is determined, based on the collected statistics, that the system is repeatedly falling behind (e.g., in maintaining smooth playback of audio), a more aggressive approach may be implemented for updating the delay (e.g., updating the delay between audio segments).

Multi-Device Setting

As described above (and illustrated in the example system 100 shown in FIG. 1), the content management system of the present disclosure includes multiple data modules (e.g., loudspeakers) playing out simultaneously at any given point in time. Thus, in accordance with at least one embodiment, the computed playout latency should adhere to the weakest link in the system.

For example, in accordance with one or more embodiments of the present disclosure, at startup of the system, every data module may, directly or indirectly, inform the Player (master) module of its network delay. As a Renderer module does not necessarily know which module in the system is the Player, the Renderer may inform its respective Follower module of the Renderer's network delay. The Follower may then aggregate all of the values from its associated Renderers and pass the aggregated value to the Player.

The Player, upon receiving the aggregated value from the Follower modules, may compute or otherwise determine the maximum values of these delays. Every link (master-client pair in the system) may routinely re-evaluate these values and update the Player when the maximum delay has changed. In accordance with at least one embodiment, only the Player is able to modify the end system latency, and the Player may do so by updating the audio frame's playout times. It should be understood that an update to the delay implies updating the timestamp of the audio to its original timestamp (e.g., based on the number of samples played out) and the desired delay. The calculation of the total delay may be the aggregation of the sub delays plus some type of margin.

Figure 2:
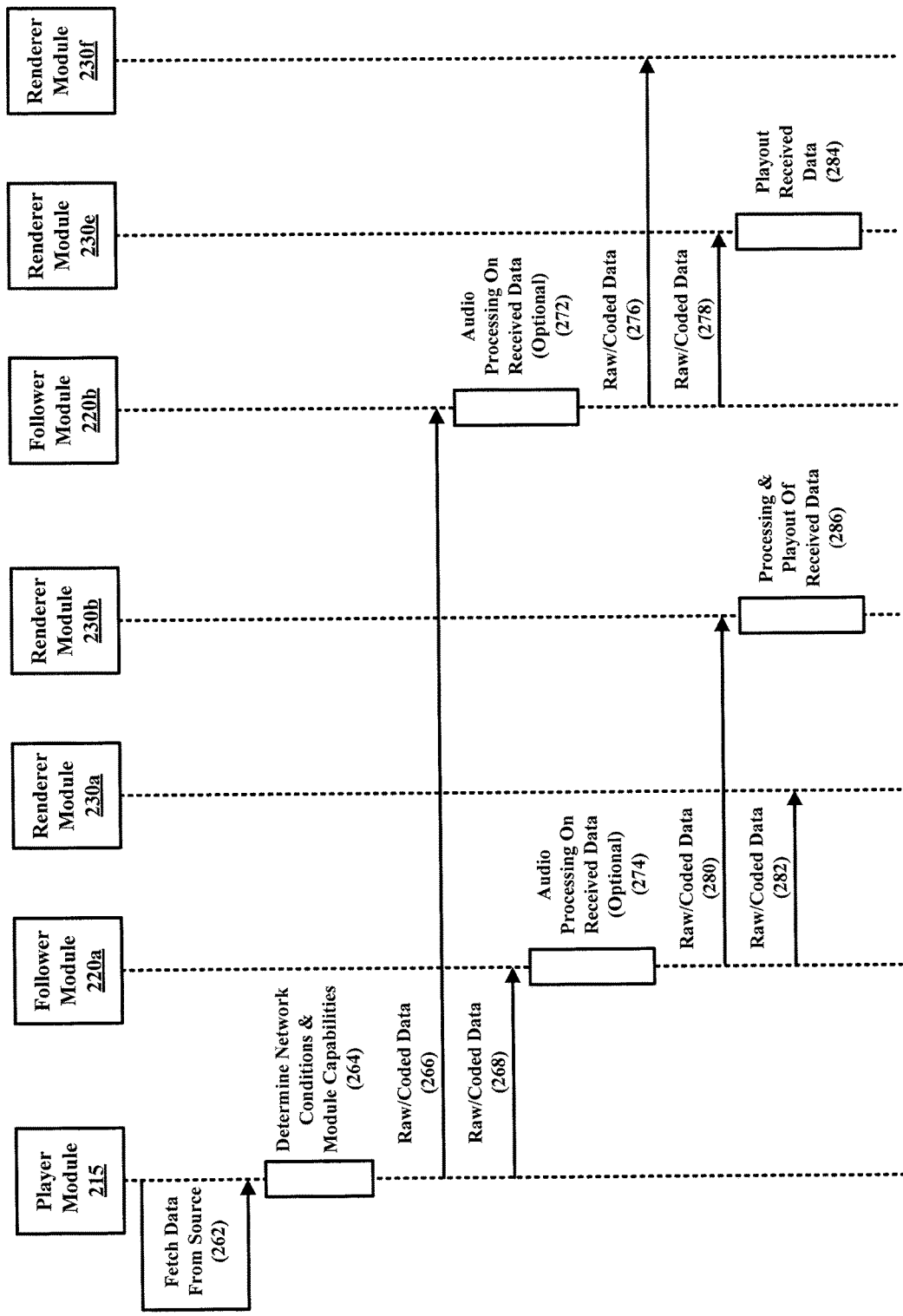
FIG. 2 is a block diagram illustrating an example data flows for distributing media data for playout in a multi-device system according to one or more embodiments described herein.

FIG. 2 shows example data flows between multiple data modules during the distribution of media data for playout in accordance with one or more embodiments described herein. For example, the data flows may be between a Player Module 215, Follower Modules 220*a* and 220*b*, and Renderer Modules 230*a*, 230*b*, 230*e*, and 230*f*, where all of the modules are components of a content management system (e.g., the example content management system 100 shown in FIG. 1), the modules obtain and/or exchange the data via one or more networks (e.g., one or both of Networks 125 and 135, which may be the same or different networks (e.g., different WLANs within a house, one wireless network and the other a wired network, etc.) in the example content management system 100 shown in FIG. 1), and where each of the modules operates in accordance with the characteristics of their respective roles described above.

In accordance with at least one embodiment, the Player Module 215 may fetch (e.g., retrieve, receive, obtain, etc.) media data from a source (262). For example, the Player Module 215 may fetch audio data from a source and distribute the audio data out to the Follower Modules 220*a* and 220*b* in the group. The source of the data obtained by the Player Module 215 may be, for example, an online audio/video streaming service or website, a portable user device (e.g., cellular telephone, smartphone, personal digital assistant, tablet computer, laptop computer, smart television, etc.) acting as a control client in the system (e.g., Control Client 150 in the example content management system 100 shown in FIG. 1 and described in detail above), a storage device containing memory for storing audio/video data (e.g., a standalone hard drive), and the like.

The Player Module 215, upon receiving the data (262) from the source, may determine (e.g., assess, evaluate, detect, etc.) one or more conditions of the network, configurations of the network, and/or capabilities of the other modules (264) in the group in order to determine a format (e.g., raw data, coded data, etc.) in which the received data should be sent to each of the other data modules. For example, in accordance with at least one embodiment, the Player Module 215 may determine a format for sending the received data to each of the Follower Modules 220*a* and 220*b* based on a level of connectivity (e.g., network capacity) between the Player Module 215 and each of the respective Follower Modules 220*a* and 220*b*, based on one or more capabilities (e.g., hardware capabilities) of each of the Follower Modules 220*a* and 220*b* (and/or each of the Renderer Modules 230*a*, 230*b*, 230*e*, and 230*f* associated with the Follower Modules 220*a* and 220*b*), based on a physical proximity between the different data modules in the group, or based on any combination thereof. It should be noted that in at least some scenarios the determination of the format in which to distribute the received data to the other data modules in the group may further be based on available licensing for the data to be distributed.

As described above, the Player Module 215 may be configured to packetize the data obtained from the source (262) and send raw or coded data packets (266) and (268) over the network to Follower Modules 220*a* and 220*b*, respectively. In accordance with at least one embodiment, the Player Module 215 may determine whether to send raw or coded data packets (266), (268) to each of the Follower Modules 220*a* and 220*b* based on available bandwidth of the network between the Player Module 215 and each of the Follower Modules 220*a* and 220*b*, based on the capabilities of each of the Follower Modules 220*a* and 220*b* (and/or each of the Renderer Modules 230*a*, 230*b*, 230*e*, and 230*f* associated with the Follower Modules 220*a* and 220*b*), etc. For example, it may be the case that one or more of the Follower Modules 220*a* and 220*b* or the Renderer Modules 230*a*, 230*b*, 230*e*, and 230*f* in the system is not capable of decoding all codecs. Also, in a scenario involving degraded (e.g., limited) network conditions (e.g., low bandwidth), it may be difficult for the Player Module 215 to send raw data to either or both of the Follower Modules 220*a* and 220*b*. In such a scenario, the Player Module 215 may instead send coded data to the Follower Modules 220*a* and 220*b*.

It should be noted that in some instances the Player Module 215, upon receiving the data from the source (262), may perform an initial decoding of the received data. In such instances, the system may be configured to re-encode the data following the initial decoding by the Player Module 215. However, it should also be understood that the data originally received by the Player Module 215 is not necessarily coded in all instances (and thus there may not be an initial decoding performed by the Player Module 215).

Each of the Follower Modules 220*a* and 220*b* may receive (e.g., over the network) the raw or coded data packets (266) and (268), respectively, from the Player Module 215 and send the data packets (282), (280), (278), (276) to their respective Renderer Modules 230*a*, 230*b*, 230*e*, and 230*f*. Each of the Follower Modules 220*a* and 220*b* may send the data packets to their respective Renderer Modules 230*a*, 230*b*, 230*e*, and 230*f* in the same format as the packets are received from the Player Module 215, or each of the Follower Modules 220*a* and 220*b* may parse the packets and perform various operations (272), (274) (e.g., transcoding, audio processing, etc.) on the received data before repacketing the data for sending to the respective Renderer Modules.

In accordance with at least one embodiment of the present disclosure, each of the Renderer Modules 230*a*, 230*b*, 230*e*, and 230*f* is an endpoint of the data pipeline in the content management system (e.g., Data Modules 130*a*-130*m* in the example content management system 100 shown in FIG. 1 and described in detail above). As such, upon receiving the raw or coded data (282), (280), (278), (276) from the Follower Modules 220*a* and 220*b*, each of the Renderer Modules 230*a*, 230*b*, 230*e*, and 230*f* may be configured to playout the received data (284). In addition, each of the Renderer Modules 230*a*, 230*b*, 230*e*, and 230*f* may also be configured to perform additional local processing (286) (e.g., fade in/fade out in the context of audio) on the received data prior to playing out the data.

Figure 3:
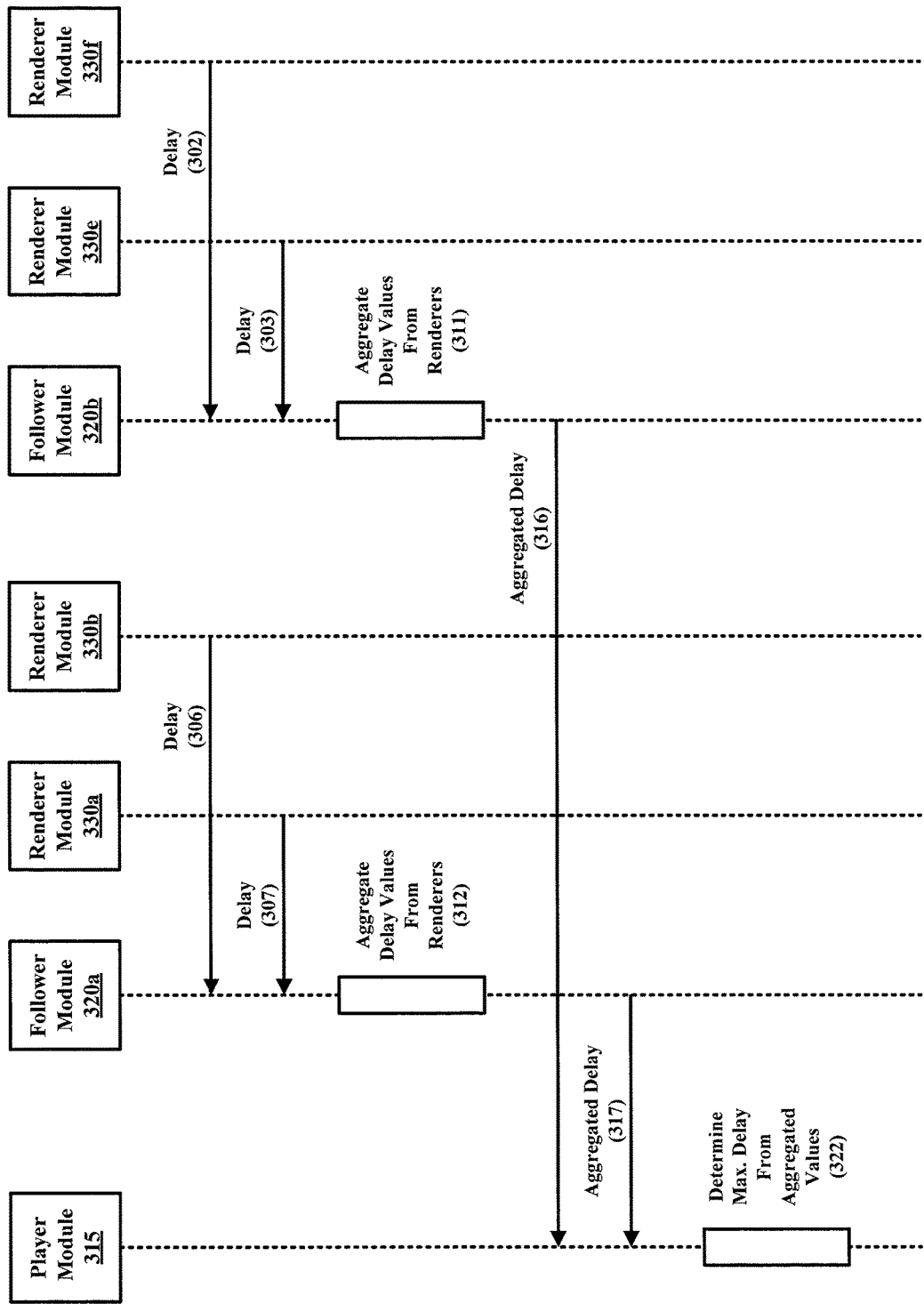
FIG. 3 is a data flow diagram illustrating example data flows for determining delay in a multi-device system according to one or more embodiments described herein.

FIG. 3 illustrates example data flows between multiple data modules in determining delay in a multi-device system, in accordance with one or more embodiments described herein. The multi-device system may be similar, for example, to the content management system 100 described above and shown in FIG. 1. For example, the data flows may be between a Player Module 315, Follower Modules 320*a* and 320*b*, and Renderer Modules 330*a*, 330*b*, 330*e*, and 330*f*. In addition, the example data flows between these different data modules in a group during the process of determining delay are similar to the exchanges of data described above with respect to determining delay in a multi-device setting. Therefore, for purposes of brevity, such example data flows are not repeated here.

Figure 4:
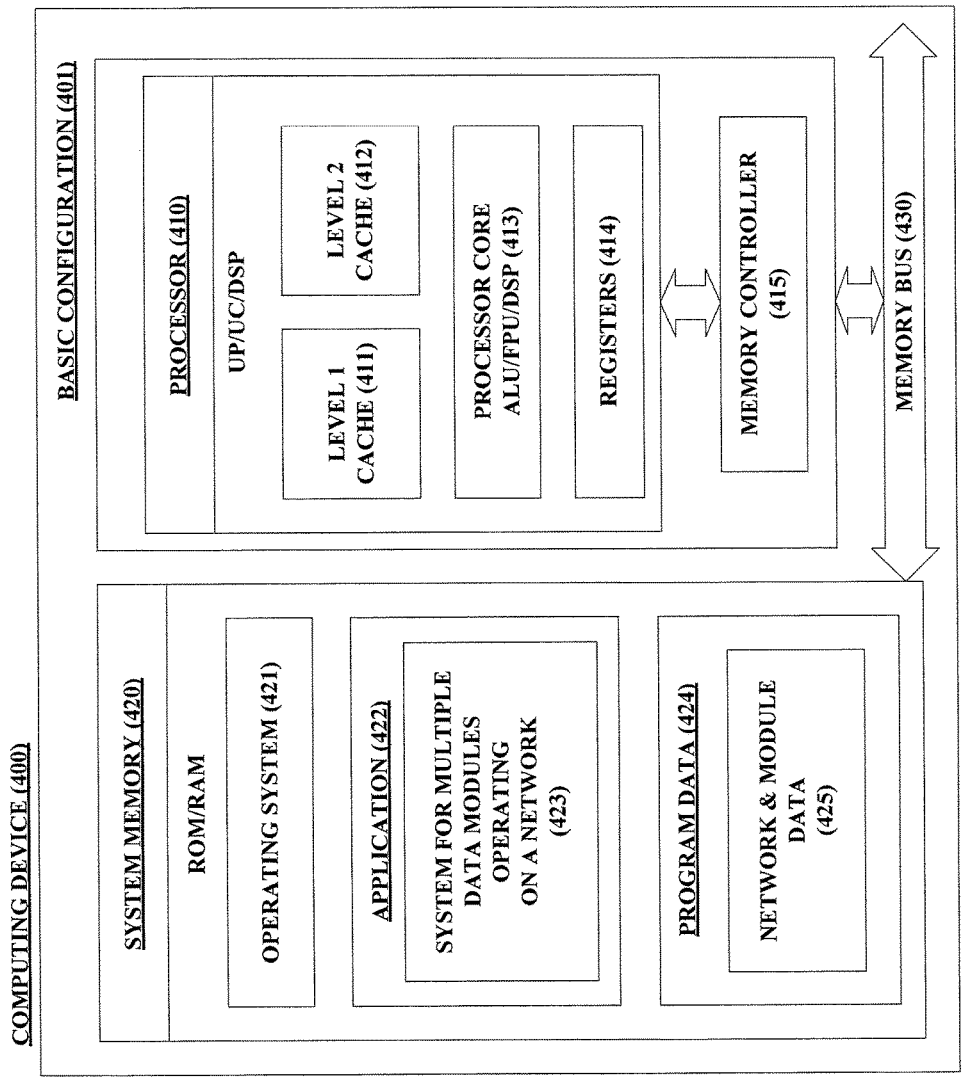
FIG. 4 is a block diagram illustrating an example computing device arranged for providing a flexible and adaptive system for data modules to playout data on a network according to one or more embodiments described herein.

FIG. 4 is a high-level block diagram of an exemplary computer (400) that is arranged for providing a flexible and adaptive system for data modules (e.g., audio devices) to playout data (e.g., audio data) on a network in accordance with one or more embodiments described herein. In a very basic configuration (401), the computing device (400) typically includes one or more processors (410) and system memory (420). A memory bus (430) can be used for communicating between the processor (410) and the system memory (420).

Depending on the desired configuration, the processor (410) can be of any type including but not limited to a microprocessor (µP), a microcontroller (µC), a digital signal processor (DSP), or any combination thereof. The processor (410) can include one more levels of caching, such as a level one cache (411) and a level two cache (412), a processor core (413), and registers (414). The processor core (413) can include an arithmetic logic unit (ALU), a floating point unit (FPU), a digital signal processing core (DSP Core), or any combination thereof. A memory controller (415) can also be used with the processor (410), or in some implementations the memory controller (415) can be an internal part of the processor (410).

Depending on the desired configuration, the system memory (420) can be of any type including but not limited to volatile memory (such as RAM), non-volatile memory (such as ROM, flash memory, etc.) or any combination thereof. System memory (420) typically includes an operating system (421), one or more applications (422), and program data (424). The application (422) may include a system for multiple data modules operating on a network (423). In accordance with at least one embodiment of the present disclosure, the system for multiple data modules operating on a network (423) is designed to achieve and maintain highly accurate synchronization (e.g., <20 microseconds (µs)) between different modules by utilizing, for example, Wi-Fi beacons generated by a common access point as a reference when estimating rendering time for data to be rendered across the modules (e.g., estimating playout time for audio data to be played out across audio devices). The system for multiple data modules operating on a network (423) is capable of achieving such tight audio synchronization between modules operating on the same access point that any detectable discrepancies in the data (e.g., audible discrepancies in the played out audio data) are eliminated, thereby improving the overall user experience.

Program Data (424) may include storing instructions that, when executed by the one or more processing devices, implement a system (423) and method for multiple data modules operating on a network. Additionally, in accordance with at least one embodiment, program data (424) may include network data (425), which may relate to various statistics routinely collected from the local network on which the system (423) is operating. In accordance with at least some embodiments, the application (422) can be arranged to operate with program data (424) on an operating system (421).

The computing device (400) can have additional features or functionality, and additional interfaces to facilitate communications between the basic configuration (401) and any required devices and interfaces.

System memory (420) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of the device (400).

The computing device (400) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (400) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It should also be noted that in situations in which the systems and methods described herein may collect personal information about users, or may make use of personal information, the users may be provided with an opportunity to control whether programs or features associated with the systems and/or methods collect user information (e.g., information about a user's preferences). In addition, certain data may be treated in one or more ways before it is stored or used, so that personally identifiable information is removed. For example, a user's identity may be treated so that no personally identifiable information can be determined for the user. Thus, the user may have control over how information is collected about the user and used by a server.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A system comprising:
a plurality of media devices connected to at least one network, including a master media device, each of the media devices operating using respective at least one processor and a memory, wherein each of the media devices is configured to:
operate in accordance with a determined operating role, wherein the determined operating role is one of a plurality of operating roles that together define a group of the media devices, and wherein each of the operating roles is characterized by specific functions to be performed by the media device within the group; and
switch between different operating roles, different groups of media devices, or both, while the system is in active operation based on one or more parameters associated with the network, with the media device, and/or with other media devices;
wherein the plurality of media devices are configured to play out simultaneously, wherein each of the plurality of media devices is configured to inform the master media device, at startup of the system and directly or indirectly, of a network delay associated with the media device, and wherein the master media device determines, and applies to the plurality of media devices, a computed playout latency that adheres to a weakest link in the system.

2. The system of claim 1, wherein each of the plurality of media devices is configured to:
receive data from a data source;
send the received data to each of the other media devices within the group of the media devices; and
playback the data from the data source in a pre-set time established for the group of the media devices.

3. The system of claim 2, wherein a media device in the group operating in accordance with a first operating role is configured to:
establish the pre-set time for playback of the data from the data source; and
communicate the pre-set time to the other media devices in the group such that the playback of the data by the group of media devices is in synchronization.

4. The system of claim 1, wherein a media device operating in accordance with a first operating role is configured to:
receive data from a data source;
determine, for each of the other media devices in the group of media devices, a format in which to send the received data to the media device based on a level of connectivity with the media device and/or a capability of the media device; and
send the data to each of the other media devices in the determined format for the respective media device.

5. The system of claim 4, wherein the determined format for sending the received data to each of the other media devices is as raw data or as coded data.

6. The system of claim 1, wherein the one or more parameters associated with the network, with the data module, and/or with other media devices includes one or more of: a condition of the network, a configuration of the network, a capability of the media device, and a capability of the other media devices.

7. The system of claim 4, wherein determining the format in which to send the received data to each of the other media devices in the group is based on one or more of: network capacity between different media devices, physical proximity between different media devices, hardware capabilities of each of the media devices, and available licensing for the data to be transmitted.

8. The system of claim 1, wherein a media device operating in accordance with a first operating role is configured to:
determine a delay associated with each of the other media devices in the group of media devices; and
modify a common delay applied to the playout of data between different media devices in the group based on the determined delays associated with each of the other media devices.

9. The system of claim 8, wherein the delay associated with each of the other media devices in the group is one or both of a network delay and a processing delay internal to the media device.

10. The system of claim 8, wherein the media device operating in accordance with the first operating role is configured to:
receive aggregated delay values from media devices in the group operating in accordance with a second operating role;
determine a maximum delay from the aggregated delay values; and
modify the common delay applied to the playout of data between different media devices based on the determined maximum delay.

11. The system of claim 10, wherein the aggregated delay values received from the media devices operating in accordance with a second operating role include delay values associated with media devices in the group operating in accordance with a third operating role, wherein the third operating role is characterized by playout of the data from the data source.

12. The system of claim 2, wherein the data received from the data source is audio data.

13. The system of claim 12, wherein each of the plurality of media devices is an independent audio device.

14. The system of claim 12, wherein at least one of the plurality of media devices is an independent audio device.

15. The system of claim 14, wherein the audio device is a loudspeaker device.

16. A computer-implemented method comprising:
determining, by a data module, an operating role for the data module to operate within a group of data modules in communication with one another over a network, including a master data module, wherein the determined operating role is one of a plurality of operating roles that together define the group of data modules, and wherein each of the operating roles is characterized by specific functions to be performed by the data module within the group;
operating, by the data module, in accordance with the determined operating role; and
while operating, switching to a different operating role, to a different group of data modules, or both, based on one or more parameters associated with the network, with the data module, and/or with other data modules in the group;
wherein the group of data modules are configured to play out simultaneously, wherein each of the group of data modules is configured to inform the master data module, at startup and directly or indirectly, of a network delay associated with the data module, and wherein the master data module determines, and applies to the group of data modules, a computed playout latency that adheres to a weakest link among the group of data modules.

17. The method of claim 16, wherein the one or more parameters associated with the network, with the data module, and/or with other data modules in the group includes one or more of: a condition of the network, a configuration of the network, a capability of the data module, and a capability of the other data modules.

18. The method of claim 16, wherein operating in accordance with the determined operating role includes one or more of:
  receiving data from a data source;
  sending the received data to one or more of the other data modules within the group of the data modules; and
  playing back the data from the data source in a pre-set time established for the group of the data modules.

19. The method of claim 18, wherein the data received from the data source is audio data.

20. The method of claim 16, wherein the group of data modules is a group of independent audio devices.

* * * * *